United States Patent [19]

Glass

[11] 4,338,341
[45] Jul. 6, 1982

[54] STIFF DOUGH MAKE-UP MACHINE AND METHOD OF USING SAME

[75] Inventor: Earl Glass, Cincinnati, Ohio

[73] Assignee: AMF Incorporated, White Plains, N.Y.

[21] Appl. No.: 152,903

[22] Filed: May 23, 1980

[51] Int. Cl.³ .......................... A21C 5/04; B29C 3/02; G01N 3/08; A21D 8/00

[52] U.S. Cl. ................................. 426/231; 264/40.7; 425/145; 425/149; 425/239; 425/241; 426/503; 426/512

[58] Field of Search ............... 425/145, 149, 238, 239, 425/240, 241, 98, 169, 170; 264/40.3, 40.7; 426/503, 504, 231, 512

[56] References Cited

U.S. PATENT DOCUMENTS

| | | | |
|---|---|---|---|
| 850,074 | 4/1907 | Streich | 425/239 |
| 1,326,930 | 1/1920 | Hewitt | 425/240 |
| 1,522,594 | 1/1925 | Pointon | 425/239 |
| 1,857,927 | 5/1932 | Mason | 425/241 |
| 1,858,831 | 5/1932 | Kremmung | 425/241 |
| 2,151,444 | 3/1939 | Russell | 425/239 |
| 2,178,406 | 10/1939 | Rhodes | 425/239 |
| 2,666,229 | 1/1954 | Vogt | 425/239 |
| 2,693,155 | 11/1954 | Bay | 425/239 |
| 2,754,774 | 7/1956 | Vogt | 425/241 |
| 2,858,775 | 11/1958 | Marasso | 425/98 |
| 3,489,104 | 1/1970 | Wolff | 425/421 |
| 3,608,002 | 9/1971 | Wurstlein | 264/40.3 |
| 3,773,448 | 11/1973 | Poot | 425/241 |
| 4,143,687 | 3/1979 | Belioci | 264/40.3 |

FOREIGN PATENT DOCUMENTS

| | | | |
|---|---|---|---|
| 1241771 | 6/1967 | Fed. Rep. of Germany | 425/239 |
| 759075 | 9/1980 | U.S.S.R. | 425/237 |

*Primary Examiner*—Willard E. Hoag
*Attorney, Agent, or Firm*—David E. Dougherty; Charles J. Worth

[57] ABSTRACT

Means for enhancing the operation of a make-up machine with a rotating drum type scaling means for stiff dough, comprising hopper means and means operatively associated with the hopper means for simultaneously mildly degassing and positively feeding dough to the scaling means.

8 Claims, 1 Drawing Figure

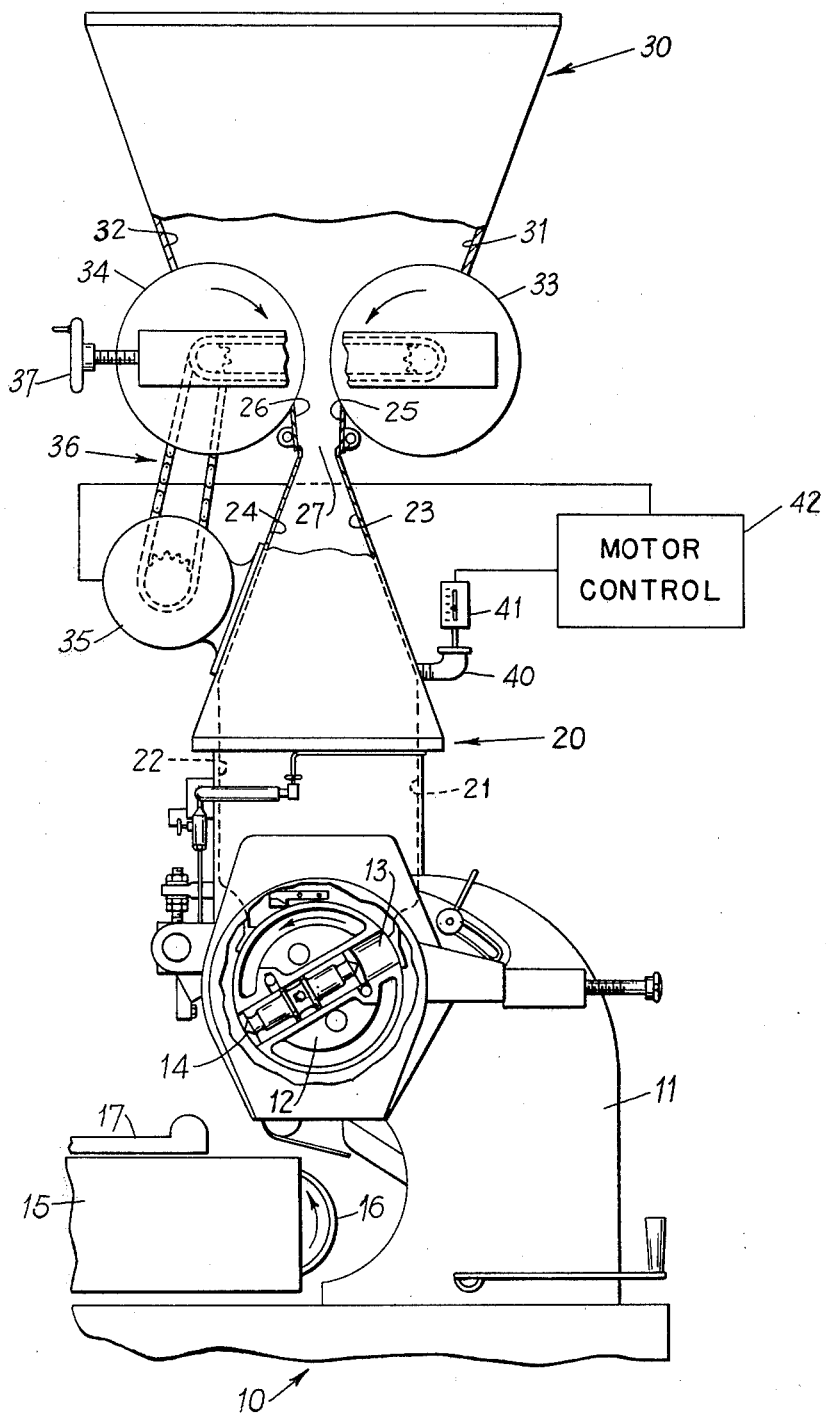

STIFF DOUGH MAKE-UP MACHINE AND METHOD OF USING SAME

This invention relates generally to machines for handling plastic material such as dough, and more particularly, for feeding such material which is to be divided into volumetrically scaled portions.

Conventionally, dough is scaled or divided into equal volumetric portions which thereafter are rolled into balls and deposited into baking pans by make-up equipment as is shown, for example, in U.S. Pat. No. 2,858,775 which was granted Nov. 4, 1958 to F. D. Marasso. The make-up equipment of the Marasso patent is based on the batch feed process wherein dough is loaded into a funnel hopper for a predetermined period of operation. This, however, causes a sufficiently long development time to create or produce measurable differences in the properties between the first and last portions of dough of a batch since the dough continues to ferment while in the hopper.

One approach to eliminate the foregoing is to provide a continuous flow of dough directly into the dough divider, while another approach, is to provide an auger type degasser to feed essentially deaerated dough into the hopper at a rate coincidental with the scaling rate. Although, the foregoing will substantially reduce or negate the effects of the rest or development time of the dough in the hopper, problems arise in coordinated feed and scaling rates while the auger creates a shearing action within the dough tending to break down the gluten structure which was purposely developed during dough mixing. It should be appreciated that such problems are present with various types of dough and are amplified or are of particular concern when making hard rolls and some types of bread loaves because of the stiffness of the dough.

Accordingly, an object of the present invention is to provide improved dough degassing and positive feed means for the scaling or dough dividing portion of dough make-up apparatus.

Another object of the present invention is to provide the foregoing dough degassing and positive feed means with an automatic control.

And, another object of the present invention is to retain degassed dough under a minimum pressure while in the hopper prior to scaling.

Still, another object of the present invention is to coordinate the rate of degassing and feeding dough into the hopper to the rate of scaling.

The foregoing and other objects and advantages will appear more fully hereinafter from a consideration of the detailed description wherein one embodiment of the invention is illustrated by way of example. It is to be expressly understood, however, that the drawing is for illustration purposes only, and is not to be construed as defining the limits of the invention.

The single FIGURE is an elevational view, with portions thereof broken away, illustrating the scaling means of dough make-up apparatus embodying the present invention.

Referring now to the drawing, a dough make-up machine 10 (shown in part) is provided with frame means 11 supporting a rotating drum 12 with a line of through bore scaling cylinders 13 (only one shown) with double acting pistons 14 (only one shown) reciprocal in the cylinders, substantially as disclosed in the aforementioned Marasso U.S. Pat. No. 2,858,775. The frame means 11 includes a table 15 having an endless belt type conveyor 16 and rounder bars 17. In normal operation, as the drum 12 rotates, the reciprocating pistons 14 will draw dough from a hopper into corresponding ends of the cylinders 13 while simultaneously discharging volumetrically equal dough portions from the opposite ends of the cylinders on to the endless belt conveyor 16 for the dough rounding operation by rounder bars 17. When the ends of the cylinders 13 are completely filled they will contain volumetrically equal dough portions.

Although this type of scaling equipment efficiently handles dough for soft rolls, buns and the like, until the present time dough for hard rolls and some types of bread loaves was too stiff and bucky to be efficiently and economically scaled in this manner. Because of the character of the dough, filling of the cylinders has been erratic during normal operation of this equipment. Reducing the speed of the equipment is uneconomical and greatly increases or amplifies the weight differences of volumetrically equal dough portions at the beginning and end of a run because of the extended rest period or development time of the dough in the hopper.

In accordance with the present invention, a closed feed hopper 20, with its discharge in communication with the drum 12, is provided with a pair of spaced parallel vertical walls 21 and 22, and a pair of spaced upper walls 23 and 24 extending upwardly from the vertical walls. The upper walls 23 and 24 converge to form a throat 27 at the top of the hopper 20.

An open funnel hopper 30 is provided above the closed hopper 20 and has a pair of converging walls 31 and 32 extending downwardly to a spaced pair of nip or feed rollers 33 and 34 forming the bottom of the funnel hopper. A pair of wipers or doctor blades 25 and 26 for the rollers 33 and 34 are suitably mounted at the upper ends of the walls 23 and 24.

As indicated, manual control means 37 is provided to adjust the interspace between the rollers 33 and 34 which are rotatably driven oppositely to one another by a motor 35 through suitable drive means 36. To control the operation or feed rate of the rollers 33 and 34 in accordance with the scaling rate the motor 35 is provided with a control 42 having switch or similar means 41 responsive to pressure in the hopper 20 as sensed by means 40. The pressure in the hopper 20 is maintained at a minimum level or within an acceptable range, as established by the pressure responsive means 41, sufficient to keep the dough in contact with the drum 12. Motor 35 preferably is a variable speed motor which increases or decreases the speed of rollers 33 and 34 as the pressure varies in the hopper 20. Alternatively, motor 35 can be a constant speed motor which starts and stops rollers 33 and 34 as required.

In operation, the rollers 33 and 34 apply a mild degassing action, which does not break down the gluten structure, to the dough they feed from a batch in the funnel hopper 30 through the closed hopper 20 to the cylinders 13 of the drum 12. The positive dough feed by the rollers 33 and 34 not only permits normal operation of the scaling equipment which limits the rest period or development time of the dough in the hoppers 20 and 30, but also tends to retard and maintain the dough at a desired level of development as a result of the mild degassing action resulting from compression between the rollers which does not break down the gluten structure.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A method for enhancing the scaling of stiff dough comprising:

degassing and positively feeding stiff dough from an open feed hopper by moving said dough between two rotating feed rolls, through a closed pressure retaining hopper and to a rotating scaling drum having plural through cylinders and a double-acting piston in each of said cylinders, sensing pressure in said closed hopper and controlling pressure in said closed hopper by varying the rotation speed of said two rolls in response to the sensed pressure in said closed hopper and maintaining the minimum pressure in said closed hopper necessary to keep said dough in contact with said scaling drum.

2. The method in accordance with claim 1, including automatically controlling the positive feed rate of the dough in accordance with the scaling rate.

3. The method in accordance with claim 1, including maintaining the positively fed dough at a pressure within a predetermined range;

sensing the pressure; and automatically varying the positive feed rate in response to changes of sensed pressure.

4. Dough scaling apparatus comprising: an open feed hopper above two spaced rotatable positive feed rolls for mildly degassing and feeding stiff dough, a closed hopper means beneath said feed rolls, said closed hopper means providing a pressure retaining enclosure in cooperation with said drum and said rolls, pressure sensing means in communicating relationship with the interior of said closed hopper means, control means connected with said pressure sensing means and connected with drive means for said two feed rolls and suitable for controlling the rotational speed of said two rolls in response to the sensed pressure in said closed hopper.

5. The enhancing means in accordance with claim 4, including means for automatically controlling the feed rate of said positive feed means in accordance with the scaling rate.

6. The enhancing means in accordance with claim 4, including means for sensing pressure within said hopper means with positively fed dough;

means for establishing an acceptable level of pressure; and means for automatically varying the feed rate of said positive feed means in response to changes in sensed pressure.

7. The enhancing means in accordance with claim 4, wherein said means mildly degassing and positively feeding dough comprising a pair of rollers rotating oppositely to one another forming the bottom of said funnel hopper and being disposed in spaced face to face relationship with the space therebetween defining the funnel hopper discharge to said feed hopper; and motor means for rotatably driving said rollers.

8. The enhancing means in accordance with claim 7, including means for establishing an acceptable level of pressure, and means connected to both of said means and said motor means for varying the speed of said rollers in response to differences between sensed and acceptable pressures.

* * * * *